United States Patent [19]
Yoon

[11] Patent Number: 5,867,782
[45] Date of Patent: Feb. 2, 1999

[54] METHOD OF INDICATING OUTER COMMUNICATION RANGE IN DIGITAL CORDLESS TELEPHONE SYSTEM

[75] Inventor: Sung-Pyo Yoon, Seongnam, Rep. of Korea

[73] Assignee: SamSung Electronics Co., Ltd., Kyungki-do, Rep. of Korea

[21] Appl. No.: 685,586

[22] Filed: Jul. 24, 1996

[30] Foreign Application Priority Data

Jul. 24, 1995 [KR] Rep. of Korea .................. 1995 21895

[51] Int. Cl.$^6$ ................................................. H04M 11/00
[52] U.S. Cl. ......................... 455/421; 455/462; 455/465; 455/502; 455/517; 455/67.7; 370/280; 370/347
[58] Field of Search ..................... 455/403, 421, 455/422, 432, 436–437, 443, 450, 455, 456, 457, 462, 465, 517, 566, 524, 575, 502, 67.1, 67.7, 154.1, 154.2, 156.1, 161.1, 161.3, 88, 100–101, 103, 104, 105, 114–115, 117, 229; 370/280, 337, 347, 252; 340/573, 539, 309.15; 379/103–108

[56] References Cited

U.S. PATENT DOCUMENTS

| | | |
|---|---|---|
| 4,939,766 | 7/1990 | Umemoto et al. . |
| 4,996,715 | 2/1991 | Marui et al. . |
| 5,032,835 | 7/1991 | DeLuca . |
| 5,049,875 | 9/1991 | DeLuca et al. . |
| 5,134,708 | 7/1992 | Marui et al. . |
| 5,193,216 | 3/1993 | Davis . |
| 5,203,013 | 4/1993 | Breeden et al. ........................ 455/67.7 |
| 5,243,641 | 9/1993 | Evans et al. . |
| 5,280,541 | 1/1994 | Marko et al. ............................ 455/462 |
| 5,327,578 | 7/1994 | Breeden et al. . |
| 5,373,548 | 12/1994 | McCarthy . |
| 5,426,690 | 6/1995 | Hikuma et al. .......................... 455/462 |
| 5,535,205 | 7/1996 | Horii ....................................... 370/347 |
| 5,544,224 | 8/1996 | Jonsson et al. ......................... 455/455 |
| 5,644,620 | 7/1997 | Shimura .................................. 455/421 |

*Primary Examiner*—Doris H. To
*Attorney, Agent, or Firm*—Robert E. Bushnell, Esq.

[57] ABSTRACT

A digital cordless telephone system comprising a base station and a cordless handset unit capable of time division duplex communicating with each other over at least one radio frequency channel at a unit time interval. Whether the handset unit is in an outer communication range from the base station is determined by a series the steps of: determining whether a hand shake error is periodically generated during communication; when the hand-shake error is generated, transmitting a link reestablishment request message to the base station; and reestablishing a radio link after the transmission of the link reestablishment request message and outputting an alarm tone indicating that the handset unit is in the outer communication range.

13 Claims, 3 Drawing Sheets

METHOD OF INDICATING OUTER COMMUNICATION RANGE IN DIGITAL CORDLESS TELEPHONE SYSTEM

CROSS-REFERENCE TO RELATED APPLICATION

This application makes reference to, incorporates the same herein, and claims all benefits accruing under 35 U.S.C. §119 from an application for *Method Of Indicating Outer Communication Range In Digital Cordless Telephone System* earlier filed in the Korean Industrial Property Office on 24 Jul. 1995, and there duly assigned Ser. No. 21895/1995.

BACKGROUND OF THE INVENTION

1. Technical Field

The present invention relates to a digital cordless telephone system, and particularly to a method of accurately detecting and indicating an outer communication range in a digital cordless telephone system.

2. Background Art

In general, conventional cordless telephone systems available in the market today operate on ten or more separate frequency channels. These telephones have generally been used to allow the user to make and receive telephone calls with a cordless handset unit connected by a radio link to a fixed base station. Because of radiated power limitations on the radio link, however, the handset unit must be used within a communication range of a few hundred feet of the base station. The actual communication range of operation in any given situation depends on the radio propagation characteristics of a particular environment. It is extremely important that the communication range between the handset unit and the fixed base station be monitored and the user be notified when the handset unit is out of the communication range so that the user can return to the coverage area; otherwise, the communication line can be disconnected.

Conventionally, there are several known techniques for determining whether the handset unit is within the communication range of the fixed base station of a cordless telephone system. For example, in U.S. Pat. No. 4,939,766 for *Radio Telephone System*, Umemoto et al. disclose a cordless telephone system in which a predetermined threshold value is set for comparison with the intensity of a received electric field generated in the radio line so that, when the received electric field intensity does not reach the threshold value because the handset unit is outside of the communication range from the fixed base station, an alarm tone is generated to notify the user that he is out of the communication range from the fixed base station. One difficulty in implementing functional out-of-range indicators of Umemoto '766 is that conventional cordless telephone systems use a time division duplex (TTD) transmission scheme on a single RF channel. TTD transmission optimizes the use of the available radio frequency spectrum by allowing transmission of voice and data in both directions between the fixed base station and the cordless handset unit. Specifically, the cordless handset unit and the fixed base station alternately transmit and receive one-millisecond bursts of information every two milliseconds, one receiving while the other transmit. There is no reliable way for an unsynchronized receiver monitoring an active channel on which a call is in progress to tell whether it is monitoring a transmission from a handset unit or from a base station at any given moment in time. Moreover, it is very difficult to measure the received electric field intensity generated from the radio line accurately, and consequently the outer communication range on the basis of the electric field intensity. Therefore, most cordless telephone systems require separate circuitry constructed therein to accurately measure a received electric field intensity repeatedly for every time unit; otherwise, an alarm tone or a visual display of alarm message notifying the user that the handset unit is out of the communication range may occur unreliably.

Another method is disclosed, for example, in U.S. Pat. No. 5,193,216 for *Detecting Out Of Range In Response To A Loss Of Signal And A History Of Approaching Out Of Range Prior To The Loss Of Signal* issued to Davis, U.S. Pat. Nos. 5,203,013 and 5,327,578 for *Radio Telephone System Supporting Busy And Out-Of-Range Indications* issued to Breeden et al., and U.S. Pat. No. 5,373,548 for *Out-Of-Range Warning System For Cordless Telephone* issued to McCarthy, in which a RF signal level received from the handset unit is measured by the fixed base station to provide a warning tone at the earpiece of the cordless handset unit if the RF signal level is below a minimum threshold level. In Davis '216, if the RF signal is not detected, an "out-of-range" warning signal is generated to notify the user that the handset unit is out of its communication range based on a history of received signal strength values. In the cordless telephone system of McCarthy '548, the warning signal is provided such that even if the handset unit is beyond the communication range of the cordless telephone, the user can still hear the warning signal. The fixed base station will transmit the "out-of-range" warning signal to the handset unit for a predetermined number of times and then, if the cordless handset unit does not come back into the operating communication range of the base station, the base station will then disconnect from the telephone line. While these conventional methods of determining an outer communication range of a cordless telephone system have their own merits, I have found that further improvements can be contemplated.

SUMMARY OF THE INVENTION

Accordingly, it is an object of the present invention to provide an improved cordless telephone system comprising a base station and a cordless handset unit capable of time division duplex communicating with each other over at least one radio frequency channel.

It is another object to provide a digital cordless telephone system and method for efficiently and accurately determining whether a handset unit is in an outer communication range from a base station.

These and other objects of the present invention can be achieved by a digital cordless telephone system comprising a base station and a cordless handset unit capable of time division duplex communicating with each other over at least one radio frequency channel at a unit time interval. The method of determining whether the handset unit is in an outer communication range from the base station includes the steps of determining whether a hand shake error is periodically generated during communication; when the hand-shake error is generated, transmitting a link reestablishment request message to the base station; and reestablishing a radio link after the transmission of the link reestablishment request message and outputting an alarm tone indicating that the handset unit is in the outer communication range.

The present invention is more specifically described in the following paragraphs by reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein.

DETAILED DESCRIPTION OF THE PREFERRED EMBODIMENT

Figure 1:
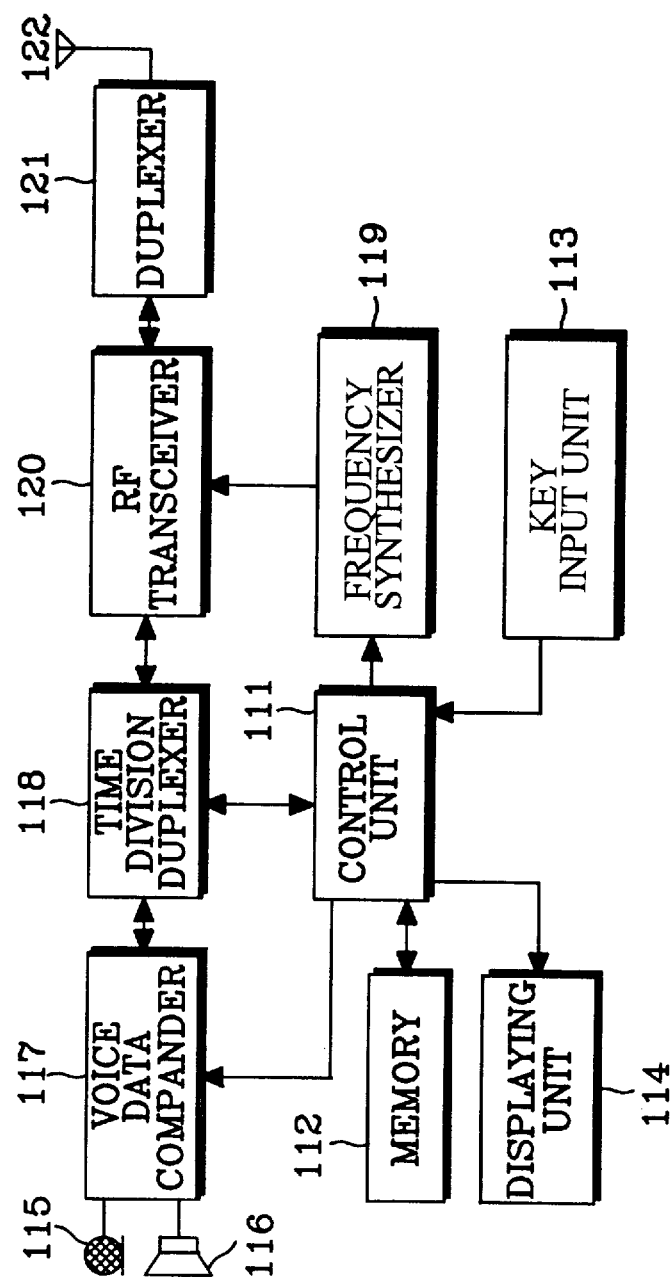
FIG. 1 illustrates a digital cordless telephone system comprising a base station and a cordless handset unit constructed according to the principles of the present invention.

Referring now to the drawings and particularly to FIG. 1, which illustrates a digital cordless telephone system having a base station and a cordless handset unit constructed according to the principles of the present invention. As shown in FIG. 1, the cordless handset unit of the digital cordless telephone system includes a control unit 111 for controlling overall operations of the cordless telephone system. A memory 112 which may be composed of an electrically erasable programmable read-only-memory (EEPROM) or a random-access-memory (RAM) is used to store an application program and initial service data and temporarily stores data generated during the operation of the cordless telephone system. A key input unit 113 includes an alpha numeric key for allowing the user to make a telephone call and generate key data to performing various modes of operation to the control unit 111. A voice data compander 117 (ADPCM) modulates a voice signal received from a microphone 115 and compresses the modulated voice signal under control of the control unit 111. In addition, the voice data compander 117 also demodulates received voice data in a compressed form and expands the demodulated voice data to generate an expanded voice signal to a speaker 116. A time division duplexer 118 changes signal output from the voice data compander 117 to a transmission frame under the control of the control unit 111 and a reception radio frequency RF signal to a reception frame so that the transmission and the reception of voice data can be alternately performed.

A duplexer 121 is connected to an antenna 122 and separates a transmission RF signal and a reception RF signal. A RF transceiver 120 is connected between the duplexer 121 and the time division duplexer 118 for changing the transmission frame signal received from the time division duplexer 118 to a RF signal for output to the duplexer 121. In addition, the RF transceiver 120 changes the reception RF signal received from the duplexer 122 to a reception frame signal for output to the time division duplexer 118. A frequency synthesizer 119 generates a frequency synthesizing signal for allocating a transmission/reception channel of the RF transceiver unit 120 under the control of the control unit 111. A display unit 114 is used to provide a visual display of an "out-of-range" alarm signal when a cordless handset unit is outside of the communication range from a base station. The base station has similar circuit construction as shown in FIG. 1 but additionally has a public switch telephone network (PSTN) interface that is connected to a telephone line.

Figure 2:
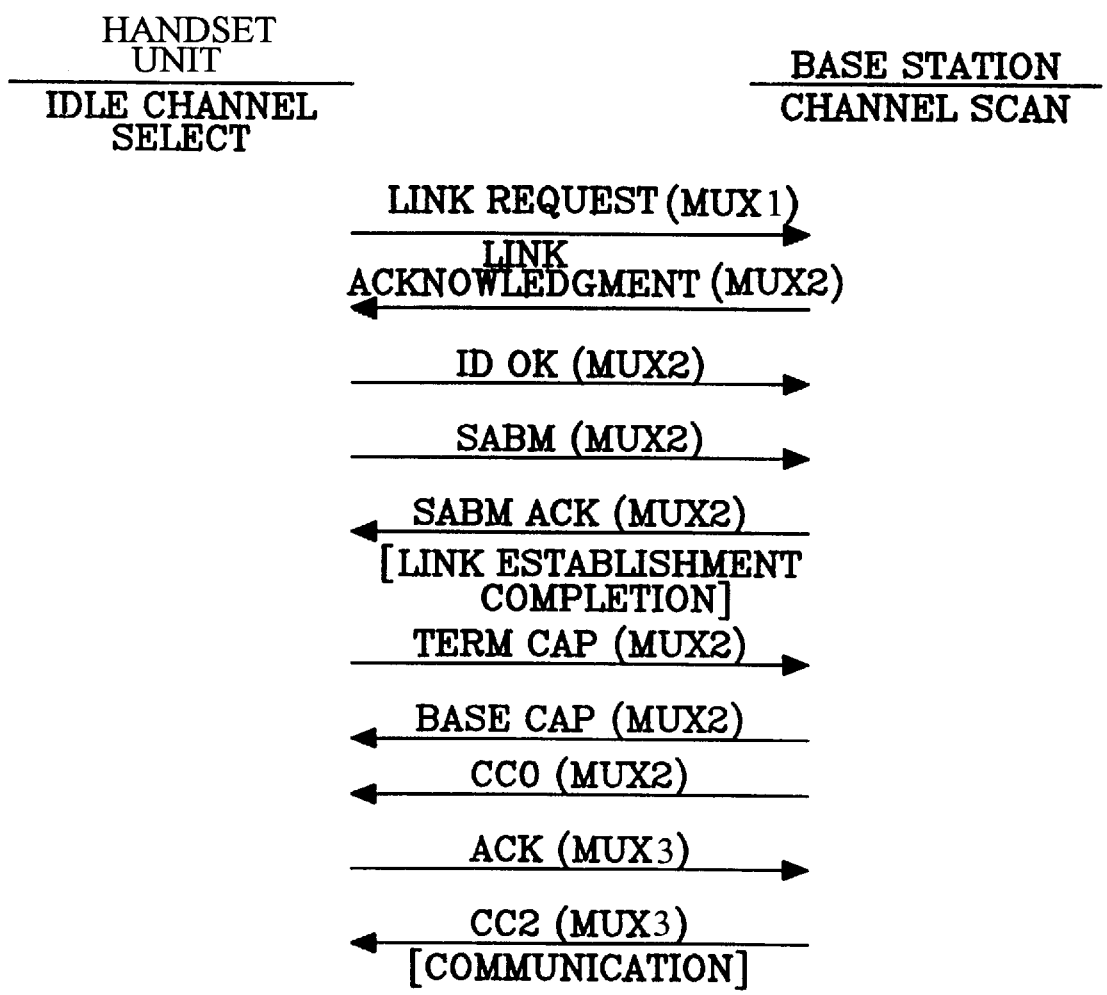
FIG. 2 illustrates a link establishment protocol between a handset unit and a base station of a cordless telephone system according to the principles of the present invention.

FIG. 2 illustrates a link establishment protocol between the cordless handset unit and the base station. When the cordless handset unit requests a link to a first multiplexer MUX1 included in the time division duplexer 118 as shown in FIG. 1 after searching for an idle channel, the base station transmits a link acknowledgment to a second multiplexer MUX2 also included in the time division duplexer 118. Thereafter, the cordless handset unit transmits its own information (ID OK) to the MUX2 and subsequently, transmits a set asynchronous balanced mode (SABM) message to the MUX2. Then, the base station which receives the ID OK and the SABM message, transmits a SABM acknowledgment message (SABM ACK) which is a response for indicating that a layer 2 is stabilized to the cordless handset unit through the MUX2 in order to complete the link establishment. After that, the cordless handset unit transmits a TERM CAP message indicating a terminal capability of the handset unit to the base station and subsequently, the base station which receives the TERM CAP message, transmits a BASE CAP message indicating a base capability to the cordless handset unit through the MUX2. Accordingly, the cordless handset unit and the base station can mutually check their respective capabilities. Hereafter, the base station transmits a channel control (CCO) message to the cordless handset unit through the MUX2 and then, the base station changes its reception mode to a third multiplexer MUX3 included in the time division duplexer 118, the cordless handset unit changes a transmission and reception line from the MUX2 to the MUX3 when the cordless handset unit receives the CCO message from the base station. Accordingly, the cordless handset unit transmits the acknowledgment of the CCO message to the base station through the MUX3. And then, the base station which receives the acknowledgment through MUX3 also transmits the CC2 message to the cordless handset unit through the MUX3. The voice channel is then connected and thus, the cordless handset unit and the base station start to communicate with each other. MUX1 and MUX3 only include data channel whereas the MUX1 includes both data and voice channel.

When the user using a cordless handset unit is in the boundary zone of the communication range from a base station, the frequency of the bit error being generated is increased in the communication channel between the cordless handset unit and the base station. At this time, in the voice channel, a mute signal is generated in response to the generation of the bit error, and in the data channel, an unstable state of the RF link is detected by checking the frame error or the hand-shake message periodically exchanged as shown in FIG. 3.

Figure 3:
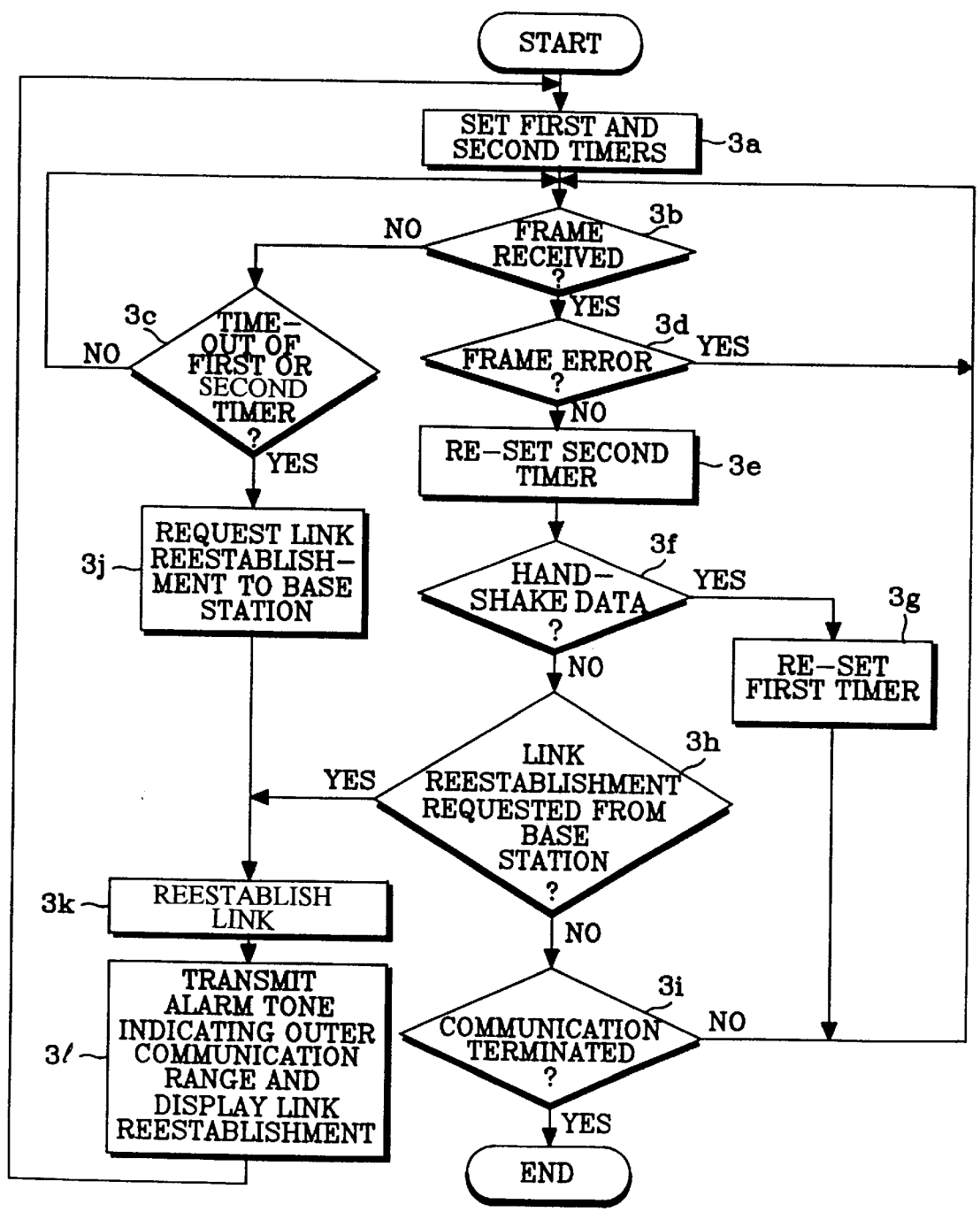
FIG. 3 is a flowchart illustrating a process of indicating that a handset unit is an outer communication range from a base station of a cordless telephone system according to the present invention.

Turning now to FIG. 3 which illustrates a process of indicating that a handset unit is an outer communication range from a base station of a cordless telephone system according to the present invention. This outer communication range indication process is performed in the cordless handset unit in conjunction with the base station of the telephone system.

First, the cordless handset unit sets a first and a second timer constructed therein, and checks during a time-out period of each timer to determine whether its own information (identification code) is received within a predetermined time period in the data channel in MUX3. Here, the cordless handset unit contains information including an identification ID of the RF link for communication and an identification ID of the cordless handset unit. After the first and second timers are set by the control unit 111 within the cordless handset unit as shown in FIG. 1 for a time-out period at step 3a, the cordless handset unit determines whether a RF signal in a frame data format is received from a base station at step 3b. If the frame data is received from a base station during the time-out period at step 3b, the cordless handset unit determines whether there is a frame error contained in the frame data received from the base station at step 3d. If the frame error is contained in the frame data received from the base station at step 3d, the cordless handset unit returns to step 3b for receiving next frame data. If the frame error is not contained in the frame data received from the base station, however, the cordless handset unit resets the second timer at step 3e.

When the second timer is reset at step 3e, the cordless handset unit searches for hand-shake data contained in frame data which is periodically transmitted from base station during communication at step 3f. If the hand-shake data is periodically received from the base station, the cordless handset unit resets the first timer at step 3g. Once the first timer is reset at step 3g, the cordless handset unit returns to step 3b for receiving next frame data. However, if the hand-shake data is not received from the base station at step 3f, the cordless handset unit determines whether a link reestablishment request is requested from the base station at step 3h. If the base station requests for a link reestablishment when hand-shake data is not found at step 3f, the cordless handset unit then reestablishes the RF link with the base station at step 3k. Once RF link is reestablished at step 3k, the cordless handset unit outputs an alarm tone indicating that the cordless handset unit is in an outer communication range through a speaker 116 and provides a visual display of the link reestablishment on the display unit 114 at step 3l.

If, on the other hand, the cordless handset unit determines that a link reestablishment is not requested from the base station at step 3h, the cordless handset unit determines whether communication is terminated at step 3i. If the communication is not terminated at step 3i, the cordless handset unit returns to step 3b for receiving the next frame data. Otherwise, the process of indicating that a handset unit is an outer communication range from a base station of a cordless telephone system terminates.

Returning now to step 3b, if the frame data is not received from a base station during the time-out period of either the first or the second timer at step 3c, the cordless handset unit transmits a link reestablishment request to base station at step 3j. Once the RF link is reestablished between the handset unit and the base station, the cordless handset unit generates an alarm tone for indicating the user that the handset unit is in an outer communication range from the base station through a speaker 116 and provides a visual display of such a link reestablishment through a display unit 114.

When the user remains within the boundary zone of the communication range, the bit error of the communication channel is continuously generated and therefore, the RF link is reestablished and the alarm tone indicating the outer communication range and the message display indicating the link reestablishment attempt are periodically provided. Accordingly, the user recognizes that he is in the boundary zone of the outer communication range from the base station and thus, he can move within the communication range.

As described above, a separate device for measuring the accurate field intensity in the conventional art is not required, and there is no need to measure repeatedly the field intensity many times within the specific unit time period. Furthermore, the aforesaid protocol can be used even in the system having a given link establishment and reestablishment communication protocol. Accordingly, the present invention has an advantage in that the cordless telephone system is capable of effectively and efficiently determining the outer communication range between a cordless handset unit and a base station by analyzing the error state of the data frame within the specific time period to thereby determine the time for reestablishing the link.

While there have been illustrated and described what are considered to be preferred embodiment of the present invention, it will be understood by those skilled in the art that various changes and modifications may be made, and equivalents may be substituted for elements thereof to adapt a particular situation without departing from the central scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of indicating an outer communication range of a digital cordless telephone system comprising a handset unit and a base station capable of time division duplex operation on at least one radio frequency channel at a unit time interval, said method comprising the steps of:

making a determination of whether a frame error is generated and hand-shake data is periodically received during communication between the handset unit and the base station;

re-setting a corresponding timer when the frame error is not generated or when said hand-shake data is received during said determination;

transmitting a link reestablishment request message to said base station upon a time-out of the timer; and reestablishing a radio frequency link between the handset unit and the base station after transmitting said link reestablishment request message, and outputting an alarm tone indicating said outer communication range.

2. The method of claim 1, further comprising the step of reestablishing the radio frequency link between the handset unit and the base station, when said link reestablishment request message is received from said base station, and outputting said alarm tone indicating said outer communication range.

3. The method of claim 2, further comprising the step of outputting said alarm tone indicating said outer communication range and simultaneously displaying a message indicating the radio frequency link reestablishment.

4. The method of claim 2, further comprised of said base station determining whether said frame error is generated during communication and then, if said frame error is not generated, resets a corresponding timer.

5. The method of claim 1, further comprising the step of outputting said alarm tone indicating said outer communication range and simultaneously displaying a message indicating the radio frequency link reestablishment.

6. A method of indicating an outer communication range of a cordless telephone system comprising a handset unit and a base station, said method comprising the steps of:

setting first and second timers included in the handset unit for a time-out period, respectively;

determining whether frame data is received from the base station during the time-out period of any one of the first and second timers;

when the frame data is received from the base station during the time-out period of any one of the first and second timers, determining whether a frame error is contained in the frame data received from the base station;

when there is no frame error contained in the frame data received from the base station, resetting the first timer and determining whether hand-shake data is contained in the frame data received from the base station;

when there is no hand-shake data contained in the frame data received from the base station, determining whether there is a link reestablishment requested from the base station; and when there is a link reestablishment requested from the base station, reestablishing a communication link between the handset unit and the base station, and generating an alarm tone indicating that the handset unit is in an outer communication range of the base station.

7. The method of claim 6, further comprised of transmitting a link reestablishment request from the handset unit to the base station by requesting reestablishment of a communication link between the handset unit and the base station, when the frame data is not received from the base station during the time-out period of one of the first and second timers.

8. The method of claim 7, further comprised of returning to receive next frame data from the base station during the time-out period of any one of the first and second timers, when there is frame error contained in the frame data received from the base station.

9. The method of claim 8, further comprised of resetting the second timer and returning to receive next frame data from the base station during the time-out period of any one of the first and second timers, when there is hand-shake data contained in the frame data received from the base station.

10. The method of claim 9, further comprised of terminating the communication link between the handset unit and the base station, when there is no link reestablishment requested from the base station.

11. The method of claim 6, further comprising:

transmitting a link reestablishment request from the handset unit to the base station to reestablish a communication link between the handset unit and the base station, when the frame data is not received from the base station during the time-out period of any one of the first and second timers;

reestablishing the communication link between the handset unit and the base station; and generating said alarm tone indicating that the handset unit is in said outer communication range of the base station, and simultaneously providing a visual display of the link establishment between the handset unit and the base station.

12. The method of claim 11, further comprised of resetting the second timer and returning to receive next frame data from the base station during the time-out period of any one of the first and second timers, when there is hand-shake data contained in the frame data received from the base station.

13. The method of claim 6, further comprised of simultaneously providing a visual display of a message indicating the link reestablishment between the handset unit and the base station while said alarm tone is generated indicating that the handset unit is in said outer communication range of the base station.

* * * * *